US010266680B2

(12) United States Patent
Park et al.

(10) Patent No.: US 10,266,680 B2
(45) Date of Patent: Apr. 23, 2019

(54) EPDM BASED RUBBER COMPOSITION FOR SPONGE SECTION IN WEATHER STRIP OF PASSENGER CAR

(71) Applicants: Hyundai Motor Company, Seoul (KR); Kia Motors Corporation, Seoul (KR); DRB Holding Co., Ltd., Busan (KR)

(72) Inventors: Joon Chul Park, Daegu (KR); Mi Yeong Jo, Suwon-si (KR); Kyung Bo Kim, Busan (KR); Dong Hyun Kim, Busan (KR)

(73) Assignees: Hyundai Motor Company, Seoul (KR); Kia Motors Corporation, Seoul (KR); DRB Holding Co., Ltd., Busan (KR)

(*) Notice: Subject to any disclaimer, the term of this patent is extended or adjusted under 35 U.S.C. 154(b) by 91 days.

(21) Appl. No.: 15/359,448

(22) Filed: Nov. 22, 2016

(65) Prior Publication Data

US 2017/0335091 A1 Nov. 23, 2017

(30) Foreign Application Priority Data

May 20, 2016 (KR) .................. 10-2016-0062335

(51) Int. Cl.
*C08K 13/02* (2006.01)
*C08K 5/39* (2006.01)
(Continued)

(52) U.S. Cl.
CPC .............. *C08K 13/02* (2013.01); *B60J 10/16* (2016.02); *B60J 10/24* (2016.02); *B60J 10/32* (2016.02); *B60J 10/80* (2016.02); *C08K 5/39* (2013.01)

(58) Field of Classification Search
CPC .. C08K 13/02; C08K 5/39; B60J 10/16; B60J 10/24; B60J 10/32; B60J 10/80
(Continued)

(56) References Cited

U.S. PATENT DOCUMENTS

| 5,342,900 A | 8/1994 | Wolpers et al. |
| 2014/0171565 A1* | 6/2014 | Wiedemeier .............. B60C 1/00 524/186 |
| 2016/0002383 A1 | 1/2016 | Beek |

FOREIGN PATENT DOCUMENTS

| EP | 2 952 538 A1 | 12/2015 |
| JP | 2005097479 A * | 4/2005 |

(Continued)

OTHER PUBLICATIONS

Tsou et al., "Fillers", Enc. Polymer Sci. and Tech., vol. 10, John Wiley & Sons. (Year: 2004).*

(Continued)

*Primary Examiner* — Josephine L Chang
(74) *Attorney, Agent, or Firm* — Morgan, Lewis & Bockius LLP

(57) ABSTRACT

An ethylene-propylene-diene monomer (EPDM) rubber composition for a sponge in a weather strip is provided. In the EPDM rubber composition free sulfur and 1,6-bis(N,N-dibenzylthiocarbamoyldithio)-hexane (BDBzTH) are included in a EPDM rubber having a pattern viscosity ($ML_{1+8}$ at 125° C.) value of 90 or more and a content of 5-ethylidene-2-norbornene (ENB) of 9 wt % or more. The EPDM rubber composition can improve compression set and provides a solution to the persistent discoloration problem of the EPDM rubber. Provided herein are EPDM compositions that are useful as a material of a sponge section in a weather strip of a passenger car.

10 Claims, 1 Drawing Sheet

(51) Int. Cl.
  *B60J 10/80* (2016.01)
  *B60J 10/16* (2016.01)
  *B60J 10/24* (2016.01)
  *B60J 10/32* (2016.01)

(58) Field of Classification Search
  USPC .......................................................... 524/426
  See application file for complete search history.

(56) References Cited

FOREIGN PATENT DOCUMENTS

| | | |
|---|---|---|
| JP | 2005-263892 A | 9/2005 |
| JP | 2008-111014 A | 5/2008 |
| JP | 2011-52098 A | 3/2011 |
| JP | 2011-111532 A | 6/2011 |
| JP | 5765104 B2 | 8/2015 |
| KR | 10-2004-0047803 A | 6/2004 |
| KR | 10-2010-0119980 A | 11/2010 |
| KR | 10-2012-0055420 A | 5/2012 |
| KR | 10-1155065 B1 | 6/2012 |

OTHER PUBLICATIONS

JP 2005-097479 A, machine translation, JPO Japan Platform for Patent Information (J-PlatPat). (Year: 2005).*
Mitsui EPT, Mitsubishi Chemical, http://www.mitsuichem.com/service/pdf/mitsui-ept_e.pdf, Apr. 2014.

* cited by examiner

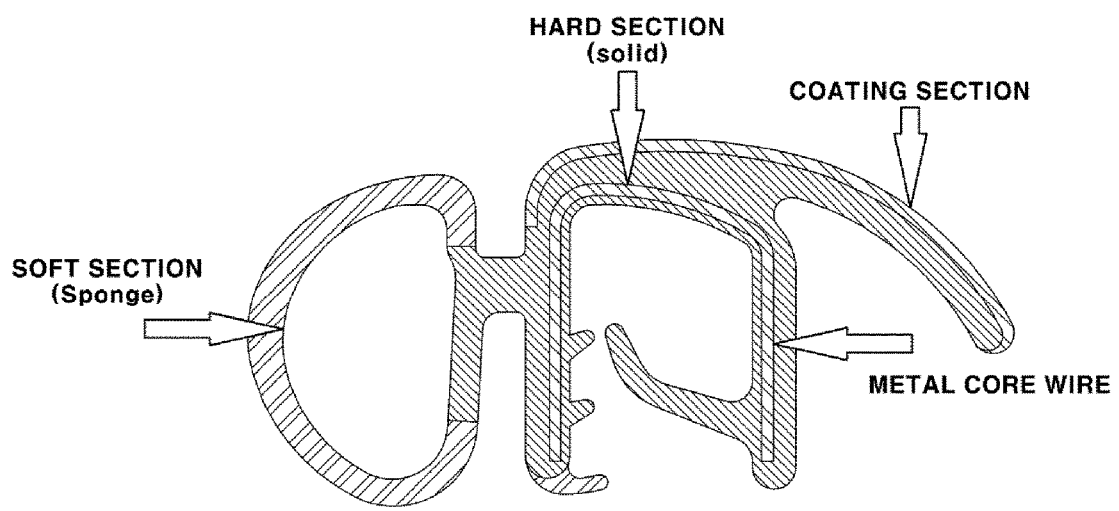

EPDM BASED RUBBER COMPOSITION FOR SPONGE SECTION IN WEATHER STRIP OF PASSENGER CAR

CROSS-REFERENCE TO RELATED APPLICATION

This application claims under 35 U.S.C. § 119(a) the benefit of Korean Patent Application No. 10-2016-0062335, filed on May 20, 2016, the entire contents of which are incorporated herein by reference for all purposes.

BACKGROUND

Technical Field

The present disclosure relates to an ethylene-propylene-diene monomer (EPDM) rubber composition which is applied to a sponge section in a weather strip of a vehicle, e.g., a passenger car.

Background Art

A weather strip is an apparatus which is positioned around a door of a passenger car to cover a periphery of glass. An important function of the weather strip is to operate as a guide and prevent detachment, operating within a precise range when the glass of the door ascends or descends. Further, the weather strip is positioned between the glass and the door, blocking an inflow of external foreign substances such as snow and rain, wind, and the like, providing a buffer, thereby enhancing comfort of the automobile.

The weather strip is made of a rubber material including an ethylene-propylene-diene monomer (EPDM) rubber as a main component and includes a firstsoft section having a sponge form compressed by the passenger car body and a second hard section having a solid form (see FIG. 1).

for a characteristic of the soft section (the sponge section) in the weather strip is compression set of this section. That is, in order to maintain sealing performance even after long-time use, a design for minimizing the compression set is important.

The above information disclosed in this Background section is only for enhancement of understanding of the background of the invention and therefore it may include information that does not form the prior art that is already known in this country to a person of ordinary skill in the art.

SUMMARY OF THE DISCLOSURE

The present invention has been made in an effort to provide a polymeric material with improved properties. The improved polymeric material finds an exemplary use in a weather strip for a vehicle, having at least some of the desirable properties set forth above.

An exemplary object of the present invention is to provide a new EPDM rubber composition having improved compression set due to repetitive load as a material applied to a sponge section in a weather strip of a passenger car and solving a persistent discoloration problem of the EPDM rubber through enhancement of heat resistance.

In one aspect, the present invention provides an EPDM rubber composition for a sponge section in a weather strip comprising: (1) from about 90 to about 100, e.g., about 100 parts by weight of an EPDM rubber comprising a pattern viscosity ($ML_{1+8}$ at 125° C.) value of about 90 or more and including 5-ethylidene-2-norbornene (ENB) of about 9 wt % or more (e.g., from about 9 wt %, about 10 wt %, about 11 wt %, about 12 wt %, about 13 wt %, about 14 wt %, about 15 wt %, or higher), and does not comprise oil; (2) from about 0.5 to about 1.0 part by weight of free sulfur; and (3) from about 0.5 to about 1.5 parts by weight of 1,6-bis(N, N-dibenzylthiocarbamoyldithio)-hexane (BDBzTH).

According to the present invention, the EPDM rubber composition has an improved effect to reduce a compression set to about 12% or less (e.g., about 11%, about 10%, about 9%, about 8%, about 7%, or less) due to repetitive load.

According to the present invention, the EPDM rubber composition has an improved heat resistance characteristic compared to similar rubber compositions to solve a persistent discoloration problem of the EPDM rubber.

Therefore, according to an exemplary embodiment of the present invention, the EPDM rubber composition is useful as a sponge material in a weather strip of the passenger car.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a schematic diagram illustrating an exemplary structure in a weather strip of a passenger car.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to an EPDM rubber composition that can be used as a sponge material in a weather strip of a passenger car.

The EPDM rubber composition for the sponge in the weather strip includes an EPDM rubber, free sulfur, 1,6-bis (N,N-dibenzylthiocarbamoyldithio)-hexane, and general additives. Respective components configuring the EPDM rubber composition of the present invention will be described below.

EPDM Rubber

A first factor influencing a compression set is an EPDM rubber. Generally, the EPDM rubber used as the sponge material in the weather strip may be classified into three groups as listed in the following Table 1 on the basis of molecular weight, by considering characteristics of refining equipment of each plant, well flowing of extruders and detention, and by considering properties of the rubber such as keeping its shape.

TABLE 1

| EPDM classification | Whether oil is included | Pattern viscosity |
|---|---|---|
| Group 1 (medium molecular weight) | None | 55-65 ($ML_{1+4}$ at 125° C.) |
| Group 2 (high molecular weight) | None | 75-90 ($ML_{1+4}$ at 125° C.) |
| Group 3 (ultra-high molecular weight) | Included | 45-60 ($ML_{1+4}$ at 150° C.) |

As a general sponge material in the weather strip, the EPDM rubber having a high molecular weight without including oil has a pattern viscosity (based on $ML_{1+4}$ at 125° C.) of 75 to 90. When the pattern viscosity is less than about 75, the shape is not fully restored during opening and closing of the door. When the pattern viscosity is greater than about 90, an operation defect is caused by a flow defect during extrusion molding or extensive cooling time is required, and as a result, the pattern viscosity is generally about 75 to about 90.

However, in the present invention, the EPDM rubber of the invention having a pattern viscosity value (based on $ML_{1+8}$ at 125° C.) of about 90 or more is used, and preferably, the EPDM rubber of the present invention having the pattern viscosity value (based on $ML_{1+8}$ at 125° C.) of from about 90 to about 95 is used. An exemplary pattern viscosity of an EPDM rubber of the invention is about 90, 91, 92, 93, 94 or about 95.

The weather strip product requires excellent weather ability due to its characteristics. In the present invention, the EPDM rubber having a pattern viscosity higher than the pattern viscosity generally proposed is used. Problems of mixing dispersion, a flow defect during extrusion molding, and/or an increase in cooling time that may arise during the manufacturing of an EPDM rubber having a high pattern viscosity can be solved by a mixing condition and an equipment process outlined herein.

In the EPDM rubber composition of the present invention, when the pattern viscosity value (based on $ML_{1+8}$ at 125° C.) is less than about 90, a property of the weather strip product deteriorates or there are many limits to maintain a cross-sectional shape in the process of extruding the product. Thus, it is preferred that the pattern viscosity of the EPDM rubber is maintained to about 90 or more, e.g., from about 90 to about 95.

In the EPDM rubber of the present invention, the content of 5-ethylidene-2-norbornene (ENB) which determines unsaturation is about 9 wt % or more, and, preferably, is from about 9 wt % to about 15 wt %. If the content of ENB is less than about 9 wt %, the unsaturation is low and thus it is difficult to implement the desired compression set. Thus, it is preferred that the content of ENB in the EPDM rubber is maintained at about 9 wt % or more.

The EPDM rubber has an ethylene content of from about 44 wt % to about 58 wt % (e.g., about 44 wt %, about 45 wt %, about 46 wt %, about 48 wt %, about 49 wt %, about 50 wt %, about 51 wt %, about 52 wt %, about 53 wt %, about 54 wt %, about 55 wt %, about 56 wt %, about 57 wt %, or about 58 wt %). When the content of ethylene in the EPDM rubber is greater than the disclosed range, the compression set of the weather strip product deteriorates or there are many limits to maintain a cross-sectional shape in the process of extruding the product.

Free Sulfur

In the EPDM rubber composition of the present invention, free sulfur is used as a vulcanizing agent.

The free sulfur may be included in a range of about 0.5 to about 2.0 (e.g., about 0.5, about 1.0, about 1.5, or about 2.0) part by weight based on 100 parts by weight of the EPDM rubber. When the content of the free sulfur is less than about 0.5 part by weight, the crosslinking is insufficient and thus the properties and the viscosity of the complete product may deteriorate. When the content of the free sulfur is greater than about 2.0 part by weight, the amount of crosslinking increases and thus long-term durability deteriorates and degradation in appearance may be observed, and the extruded product may display exterior defects.

1,6-bis(N,N-dibenzylthiocarbamoyldithio)-hexane (BDBzTH)

In the EPDM rubber composition of the present invention, the 1,6-bis(N,N-dibenzylthiocarbamoyldithio)-hexane (BD-BzTH) is included, and thus the compression set may be enhanced and discoloration may be minimized or prevented due to the improvement of heat resistance of the rubber of the invention.

The molecular weight (MW) of the 1,6-bis(N,N-dibenzylthiocarbamoyldithio)-hexane is 693 g/mol and its structure is represented by the following Chemical Formula 1.

[Chemical Formula 1]

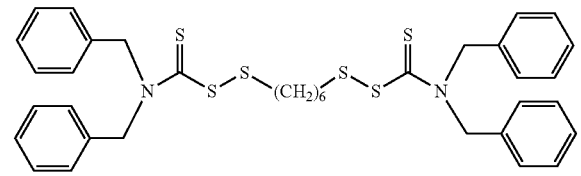

The 1,6-bis(N,N-dibenzylthiocarbamoyldithio)-hexane represented by the Chemical Formula 1 may be included in a range of about 0.5 to about 1.5 (e.g., about 0.6, 0.7, 0.8, 0.9, 1.0, 1.1, 1.2, 1.3, 1.4, or about 1.5) parts by weight based on 100 parts by weight of the EPDM rubber. When the content of the 1,6-bis(N,N-dibenzylthiocarbamoyldithio)-hexane of the Chemical Formula 1 is less than about 0.5 part by weight, the compression set may be distorted, the cross-linking density may deteriorate, and heat resistance may be decreased. When the content of the BDBzTH is greater than about 1.5 parts by weight, the tensile property of the rubber composition may slowly deteriorate.

Additives

In the EPDM rubber composition of the present invention, general additives known in the art may be included.

In the present invention, in order to improve reinforcement of the EPDM rubber, carbon black is optionally included as a rubber reinforcing agent. The carbon black gives various reinforcing functions to the rubber according to an average particle diameter, a structure, surface properties and states, and the like, and the present invention is not particularly limited to the selection of the carbon black. For example, the carbon black may be selected and used from general carbon blacks including SRF, GPF, FEF, HAF, ISAF, SAF, FT, MT, and the like, and in the present invention, FT or FEF may be suitably used. Alternatively, one or more kinds of carbon blacks may be used one kind alone or in a combination of two or more kinds. The content of the carbon black may be used in a range of about 20 to about 60 (e.g., about 20, 30, 40, 50, or about 60) parts by weight based on 100 parts by weight of the EPDM rubber. When the content of the carbon black is less than about 20 parts by weight such that a small amount is included, a desired mechanical property reinforcing effect may not be expected and when the content thereof is greater than about 60 parts by weight, an extrusion operation is difficult due to an increase in hardness and flowability.

In exemplary embodiments of the present invention, as an absorbent according to a manufacturing characteristic of a continuous extrusion vulcanizing method, calcium carbonate ($CaCO_3$) is included. The calcium carbonate is used in a range of about 10 to about 50 (e.g., about 10, 20, 30, 40, or about 50) parts by weight based on 100 parts by weight of EPDM rubber. When the content of the calcium carbonate is less than about 10 part by weight, a phenomenon in which internal bubbles are generated may not be sufficiently prevented and when the content thereof is greater than about 50 parts by weight, a dispersion defect and property deterioration may be caused.

In the present invention, in order to facilitate vulcanization, a vulcanization accelerating assistant agent may be further added. For example, zinc oxide (ZnO) or fatty acid may be used as the vulcanization accelerating assistant agent. The fatty acid may be any saturated or unsaturated, straight or branched-chain any fatty acid. In some instances, carbon atoms of the fatty acid are not particularly limited, for example, fatty acid having 1 to 30 carbon atoms and preferably 15 to 30 carbon atoms, and more particularly, saturated fatty acid including cyclohexane, hexane, octanoic acid, decanoic acid (including branched carboxylic acid such as neodecanoic acid), dodecanoic acid, tetradecanoic acid, hexadecanoic acid, octadecanoic acid (stearic acid), and the like; unsaturated fatty acid including methacrylic acid, oleic acid, linoleic acid, linolenic acid, and the like; resin acid including rosin, tall oil acid, abietic acid, and the like may be included. These fatty acids may be used one kind alone or in combination of two or more kinds. In other words, one or more kinds of fatty acids can be used alone or in combination of two or more kinds. In the present invention, zinc oxide (ZnO), stearic acid, or mixtures thereof are suitable as a vulcanization accelerating assistant agent. The content of the vulcanization accelerating assistant agent may be included with from about 3.0 to about 8.0 (e.g., about 3.0, 4.0, 5.0, 6.0, 7.0, or about 8.0) parts by weight, and preferably, from about 4 to about 7 (e.g., about 3.0, 4.0, 5.0, 6.0, or about 7.0) parts by weight based on 100 parts by weight of the EPDM rubber. When the content of the vulcanization accelerating assistant agent is less than about 3.0 parts by weight, a vulcanization accelerating effect may not be expected, and when the content thereof is greater than about 8.0 parts by weight, there may be a concern that workability, magnification, and the like deteriorate.

In exemplary embodiments of the present invention, the vulcanization accelerating agent can be one kind or a mixture of two or more kinds selected from the group consisting of 2-mercapto benzo thiazole (MBT), tetra(iso-butyl)thiuram disulfide (TiBTD), zinc dibutyl dithiocarbamate (ZnDBC), N,N-diethylthiourea (DETU), caprolactam disulfide (CLD), and the like. The vulcanization accelerating agent may be included included from about 2.5 to about 8 parts by weight, and preferably, from about 2.5 to about 6 parts by weight based on 100 parts by weight of the EPDM rubber.

In exemplary embodiments of the present invention, as an antioxidant, a general additive used in the rubber composition may be used and the selection thereof is not limited. As the antioxidant, for example, a phenol-based antioxidant, an imidazole-based antioxidant, an amine-based antioxidant, and the like may be used. The content of the antioxidant may be used with less than about 10 parts by weight, and preferably, from about 0.1 to about 4.0 (e.g., about 0.1, 0.3, 0.5, 1.5, 1.7, 2.0, 2.3, 2.5, 2.7, 3.0, 3.3, 3.5, 3.7, or about 4.0) parts by weight based on 100 parts by weight of the EPDM rubber.

In exemplary embodiments of the present invention, in order to improve a surface slip property of the weather strip product and increase wear resistance, it is preferred that a wax, e.g., a polypropylene-based wax may be used in the composition, however the present invention is not limited thereto. In some instances, it is preferred that the wax, e.g., the polypropylene-based wax, has a specific gravity of about 0.90 or less and a melting point of about 160° C. or more. The wax, e.g., the polypropylene-based wax may be included in from about 0 to about 5 (e.g., about 0, 0.1, 0.5, 1.0, 1.5, 2.0, 2.5, 3.0, 3.5, 4.0, 4.5, or about 5.0) parts by weight, and preferably, about 0.1 to about 2 (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or about 2) parts by weight based on 100 parts by weight of the EPDM rubber.

In exemplary embodiments of the present invention, the composition includes a filler that can improve mixing and rolling performance, improve dimensional stability, and reduce costs of the material. In some instances, the filler can be an inorganic filler. It is preferred that the inorganic filler used in the present invention uses a product having a particle size of about 10 μm or less and whiteness of about 95% or more, and calcium carbonate which is an exemplary filler may be used. The inorganic filler may be used in a range of about 20 to about 60 (e.g., about 20, 30, 40, 50 or about 60) parts by weight based on 100 parts by weight of EPDM. When the use amount of the inorganic filler is less than about 20 parts by weight, material costs are increased and a role as the filler is slight, and when the use amount thereof is greater than about 60 parts by weight, the extrusion operation is difficult due to an increase in hardness and a material flowabilty problem.

General Foaming Agents and General Processing Agents May be Included.

The EPDM rubber composition of the present invention having the composition described above may be prepared by appropriately adding the composition components. In some embodiments, all of the composition components can be added and mixed at one time or each component can be added and mixed in two steps. In the mixing process, mixers including a roll, an internal mixer, a banbury, and the like may be used. In some cases, when the EPDM rubber composition is molded into a sheet shape or a band shape, known molding machines such as an extruder and a presser may be used.

As described above, the present invention will be described in more detail based on the following Examples, and the present invention is not limited to the following Examples.

EXAMPLES

The following examples illustrate the invention and are not intended to limit the same.

Reference Example 1. Preparation of EPDM Rubber

The EPDM rubber used in the exemplary embodiment was KEP-2480 of Kumho Polycam product and Keltan 9950C of Laxness Co., Ltd. In some cases satisfy required properties of a sponge in a weather strip, KEP-9590 developed by a collaboration of Hyundai Motor Company and Kumho Polychem Co., Ltd. was used.

In the following Table 2, properties of KEP-9590, KEP-2480, and Keltan 9950C are summarized and listed. In some instances, a specimen was prepared by mixing 1.3 parts by weight of free sulfur in 100 parts by weight of an EPDM rubber to measure basic properties and the compression set for a basic mixture including each EPDM rubber.

TABLE 2

| Classification | | KEP-9590 | KEP-2480 | Keltan 9950C |
|---|---|---|---|---|
| Charac-teristic of EPDM rubber | Pattern viscosity ($ML_{1+8}$ at 125° C.) | 95 | 81 | 88 ($ML_{1+8}$ 150° C.) |
| | ENB content (wt %) | 10.0 | 8.9 | 9.0 |
| | Ethylene content (wt %) | 52 | 58 | 44 |
| | MWD | Medium | BI-Modal | Medium_CLCB |
| | Catalyst | Zieler-Natta | Zieler-Natta | ACE |
| | $ML_{1+4}$(100° C.) | 63.2 | 55.2 | 65.5 |
| | Shore A hardness | 58 | 58 | 59 |
| | Tensile strength (kg/cm²) | 146 | 156 | 157 |
| | Elongation % | 327 | 334 | 297 |
| | C-set (Disk) | 16.6 | 16.8 | 17.2 |

The KEP2480 and the Keltan 9950C had the pattern viscosity ($ML_{1+8}$ at 125° C.) of 81 and 88, respectively, whereas the KEP-9590 had a relatively high molecular weight of 93. In addition, the KEP-9590, the KEP2480, and the Keltan 9950C had a high ENB content which minimized the crosslinking speed and the compression set. The KEP-9590, the KEP2480, and the Keltan 9950C showed no large difference with respect to the properties of the basic mixture and the compression set.

Reference Example 2. Measuring Method of Properties

Properties of the rubber composition specimen were measured by the following method. General properties were measured at a vulcanization condition (155° C. and 20 min) and measured at a heat aging condition (70° C. and 70 hr) in order to determine heat resistance of each specimen.

Pattern Viscosity: Measured by JIS K 6300.
Shore A hardness: Measured by JIS K 6301 as a JIS standard.
Tensile strength: Measured by JIS K 6301 as a JIS standard.
Elongation: Measured by JIS K 6301 as a JIS standard.
Change in hardness: Measured by JIS K 6301.
Change Rate of Tensile Strength: Measured by JIS K 6301.
Change Rate of Elongation: Measured by JIS K 6301.
Compression Set: Measured by JIS K 6301 at a condition of Disk type 70° C.×22 hr.

Examples 1-6. Preparation of EPDM Rubber Composition for Sponge in Weather Strip For the composition ratios illustrated in the following Table 3, an EPDM rubber (KEP 2480), free sulfur, 1,6-bis (N,N-dibenzylthiocarbamoyldithio)-hexane (BDBzTH), a mixture of 2-mercapto benzothiazole far (MBT), tetra(i-sobutyl)thiuram disulfide (TiBTD), and zinc dibutyl dithio-carbamate (ZnDBC), N,N-diethyl thiourea (DETU), and caprolactam disulfide (CLD) as a vulcanization accelerating agent, a mixture of zinc oxide (ZnO) and stearic acid as a vulcanization accelerating assistant agent, and general additives were added, mixed and milled to prepare an EPDM rubber composition.

For the additives, based on 100 parts by weight of the EPDM rubber, 50 parts by weight of FEF carbon black (HS-45, Orion Co., Ltd.), 65 parts by weight of paraffin oil (P-4 of Michang Oil Ind. Co., Ltd, density of 0.86 g/cm², kinematic viscosity (40° C.) of 109.9), 40 parts by weight of calcium carbonate (density of 2.5 g/cm², whiteness of 95% or more), 2 parts by weight of polyethylene glycol, 3 parts by weight of a processing material, and 2.5 parts by weight of p,p'-oxybisbenzenesulfonyl hydrazine (OBSH) as a foaming agent were used.

TABLE 3

| Classification | | | Comparative Example | Example 1 | Example 2 | Example 3 | Example 4 | Example 5 | Example 6 |
|---|---|---|---|---|---|---|---|---|---|
| Composition (parts by weight) | EPDM rubber (KEP2480) | | 100 | 100 | 100 | 100 | 100 | 100 | 100 |
| | Free sulfur | | 1.5 | 0.5 | 0.5 | 0.5 | 0.5 | 1.5 | 2 |
| | BDBzTH | | 0 | 0.5 | 0.7 | 1 | 1.3 | 1.5 | 1 |
| | Vulcanization accelerating agent | MBT | 0.7 | 0.7 | 0.7 | 0.7 | 0.64 | 0.64 | 0.7 |
| | | TiBtd | 0.8 | 0.8 | 0.7 | 0.7 | 0.5 | 0.4 | 0.8 |
| | | ZnDBC | 0.8 | 0.8 | 0.8 | 0.8 | 0.75 | 0.7 | 0.8 |
| | | DETU | 0.9 | 0.9 | 0.9 | 0.9 | 0.9 | 0.85 | 0.9 |
| | | CLD | 1.0 | 1.0 | 1.0 | 0.6 | 0.6 | 0.6 | 1.0 |

TABLE 3-continued

| | Classification | | Comparative Example | Example 1 | Example 2 | Example 3 | Example 4 | Example 5 | Example 6 |
|---|---|---|---|---|---|---|---|---|---|
| | Vulcanization accelerating assistant agent | ZnO | 5 | 5 | 5 | 5 | 5 | 5 | 5 |
| | | Stearic acid | 2 | 2 | 2 | 2 | 2 | 2 | 2 |
| General property | $ML_{1+4}$ (100° C.) | FMB | 50.92 | 51.2 | 50.3 | 49.7 | 56.8 | 56.8 | 56.4 |
| | Rheometer (155° C. × 16 min) | $T_{10}$ (min:sec) | 1:32 | 1:42 | 1:31 | 1:23 | 1:37 | 1:47 | 1:29 |
| | | $T_{90}$ (min:sec) | 8:15 | 8:15 | 8:06 | 8:43 | 6:46 | 6:36 | 6:28 |
| | | ML (lb-in) | 1.92 | 1.9 | 1.88 | 1.9 | 2.1 | 2.21 | 2.29 |
| | | MH (lb-in) | 18.62 | 19.56 | 21.34 | 23.08 | 21.98 | 22.98 | 22.03 |
| | Specific Gravity | | 1.0938 | 1.0939 | 1.0986 | 1.0949 | 1.0916 | 1.0916 | 1.0912 |
| | Hardness (Shore A) | | 66 | 64 | 67 | 67 | 68 | 70 | 71 |
| | Tensile Strength ($kg/cm^2$) | | 156 | 166 | 141 | 141 | 158 | 158 | 147 |
| | Elongation (%) | | 342 | 372 | 234 | 203 | 363 | 363 | 254 |
| | Tear strength ($kg/cm^2$) | B type | 55 | 62 | 56 | 58 | 58 | 58 | 50 |
| Heat aging property | Hardness (Shore A) | | 69 | 68 | 73 | 75 | 69 | 69 | 75 |
| | Tensile Strength ($kg/cm^2$) | | 174 | 175 | 158 | 155 | 163 | 163 | 151 |
| | Elongation (%) | | 365 | 395 | 229 | 193 | 358 | 358 | 238 |
| | Modulus ($kg/cm^2$) | 100% | 47 | 46 | 42 | 47 | 39 | 39 | 51 |
| | Modulus ($kg/cm^2$) | 300% | 140 | 139 | — | — | 136 | 136 | — |
| | Wear amount ($mm^3$) | DIN | 104 | 106 | 77 | 64 | 88 | 104 | 119 |
| | compression set (%) | | 18.78 | 13.9 | 13.4 | 13.6 | 12.2 | 13.2 | 17.9 |

According to Table 3, the rubber composition (Comparative Example 1) without mixing the BDBzTH, the compression set was approximately 18.7%. On the other hand, it can be seen that in the rubber composition mixed with the BDBzTH, the compression set was significantly low.

The KEP 2480 was an EPDM rubber having the pattern viscosity ($ML_{1+8}$ at 125° C.) of 81 and the ENB content of 8.9 wt % and it was confirmed that desired properties were achieved by increasing the BDBzTH content and decreasing the content of free sulfur. That is, like Example 6, it can be seen that when the use amount of free sulfur was large, an adding effect of the BDBzTH (a reducing effect of the compression set) was too low and a tensile property and wear resistance were decreased.

As a result which had been confirmed from the results of Examples 1 to 6, it was confirmed that at the use amount of the BDBzTH of 0.5 to 1.5 parts by weight, a minimum compression set was shown and further, in many internal experiments, discoloration as a main chronic problem was prevented. However, it was confirmed that the rubber compositions of Examples 1 to 6 using the KEP2480 did not satisfy 12% of the compression set as a target value.

Examples 7-12. Preparation of EPDM Rubber Composition for Sponge in Weather Strip In the Examples, a rubber composition was prepared by using an EPDM rubber (KEP 9590) having a pattern viscosity ($ML_{1+8}$ at 125° C.) of 95 and the ENB content of 10 wt % as a main polymer.

That is, for the composition ratios illustrated in the following Table 4, EPDM rubber (KEP 9590), free sulfur, 1,6-bis(N,N-dibenzylthiocarbamoyldithio)-hexane (BDBzTH), a vulcanization accelerating agent, a vulcanization accelerating assistant agent, and general additives were added, mixed and milled to prepare an EPDM rubber composition.

TABLE 4

| | Classification | | Comparative Example | Example 7 | Example 8 | Example 9 | Example 10 | Example 11 | Example 12 |
|---|---|---|---|---|---|---|---|---|---|
| Composition (parts by weight) | EPDM rubber (KEP9590) | | KEP2480 (100) | 100 | 100 | 100 | 100 | 100 | 100 |
| | Free sulfur | | 1.5 | 0.5 | 0.5 | 0.5 | 0.5 | 1.5 | 2 |
| | BDBzTH | | 0 | 0.5 | 0.7 | 1 | 1.3 | 1.5 | 1 |
| | Vulcanization accelerating agent | MBT | 0.7 | 0.7 | 0.7 | 0.7 | 0.64 | 0.64 | 0.7 |
| | | TiBtd | 0.8 | 0.8 | 0.7 | 0.7 | 0.5 | 0.4 | 0.8 |
| | | ZnDBC | 0.8 | 0.8 | 0.8 | 0.8 | 0.75 | 0.7 | 0.8 |
| | | DETU | 0.9 | 0.9 | 0.9 | 0.9 | 0.9 | 0.85 | 0.9 |
| | | CLD | 1.0 | 1.0 | 1.0 | 0.6 | 0.6 | 0.6 | 1.0 |
| | Vulcanization accelerating assistant agent | ZnO | 5 | 5 | 5 | 5 | 5 | 5 | 5 |
| | | Stearic acid | 2 | 2 | 2 | 2 | 2 | 2 | 2 |
| General property | $ML_{1+4}$ (100° C.) | FMB | 50.92 | 50.9 | 50.8 | 50.2 | 56.8 | 56.4 | 55.7 |
| | Rheometer (155° C. × 16 min) | $T_{10}$ (min:sec) | 1:32 | 1:41 | 1:35 | 2:09 | 1:47 | 1:29 | 1:21 |
| | | $T_{90}$ (min:sec) | 8:15 | 8:05 | 8:01 | 7:33 | 6:46 | 7:48 | 8:34 |
| | | ML (lb-in) | 1.92 | 1.8 | 1.86 | 2.27 | 2.1 | 2.09 | 2.08 |
| | | MH (lb-in) | 18.62 | 19.56 | 21.37 | 20.4 | 23.6 | 22.5 | 22.36 |
| | Specific Gravity | | 1.0938 | 1.0933 | 1.0939 | 1.0949 | 1.0916 | 1.0916 | 1.0912 |
| | Hardness (Shore A) | | 66 | 67 | 67 | 64 | 66 | 69 | 70 |
| | Tensile Strength ($kg/cm^2$) | | 156 | 154 | 142 | 165 | 158 | 147 | 138 |
| | Elongation (%) | | 342 | 362 | 262 | 476 | 363 | 254 | 205 |

TABLE 4-continued

| Classification | | Comparative Example | Example 7 | Example 8 | Example 9 | Example 10 | Example 11 | Example 12 |
|---|---|---|---|---|---|---|---|---|
| Heat aging property | Hardness (Shore A) | 69 | 68 | 72 | 67 | 69 | 75 | 77 |
| | Tensile Strength (kg/cm$^2$) | 174 | 167 | 170 | 167 | 163 | 160 | 155 |
| | Elongation (%) | 365 | 390 | 258 | 390 | 348 | 238 | 198 |
| | Wear amount (mm$^3$) DIN | 104 | 106 | 80 | 94 | 97 | 82 | 65 |
| | compression set (%) | 18.78 | 11.6 | 9.9 | 9.3 | 9.2 | 12.8 | 15.6 |

According to Table 4, it can be seen that Examples 7 to 10 satisfy 12% or less as a target value of the compression set. That is, as the EPDM rubber, KEP 9590 having a high pattern viscosity ($ML_{1+8}$ at 125° C.) of 95 and a high ENB content of 10 wt % was used, and 0.5 to 1.0 parts by weight of free sulfur and 0.5 to 1.5 parts by weight of BDBzTH were mixed to satisfy 12% as a target value of the compression set. Particularly, the free sulfur and the BDBzTH have a complementary relationship and thus the contents thereof may be determined by considering the vulcanization density. According to many experimental results of the present inventors, in order to simultaneously improve properties and the compression set, when 0.5 to 1.0 parts by weight of the free sulfur was included based on 100 parts by weight of the EPDM rubber, the best result was exhibited when the 0.5 to 1.5 parts by weight of the BDBzTH was used. Further, it is important to manage the content of the vulcanization accelerating agent to 4.0 parts by weight or less as a total content when using the KEP 9590 rubber.

It can be seen that a pollution problem is improved by selecting and using the BDBzTH as a result obtained by adjusting the use amount of the free sulfur and the accelerating agent. The results (Table 6) of the product application evaluation are shown.

Examples 13-14. Preparation of EPDM Rubber Composition for Sponge in Weather Strip In present Examples, a rubber composition was prepared by using an EPDM rubber (Keltan 9950C) having a pattern viscosity ($ML_{1+8}$ at 150° C.) of 88 and the ENB content of 9 wt % as a main polymer.

That is, with a composition ratio listed in the following Table 5, EPDM rubber (Keltan 9950C), free sulfur, 1,6-bis (N,N-dibenzylthiocarbamoyldithio)-hexane (BDBzTH), a vulcanization accelerating agent, a vulcanization accelerating assistant agent, and general additives were added, mixed and milled to prepare an EPDM rubber composition.

TABLE 5

| | | | Comparative Example | Example 13 | Example 14 |
|---|---|---|---|---|---|
| Composition (parts by weight) | EPDM rubber (Keltan 9950C) | | KEP2480 (100) | 100 | 100 |
| | Free sulfur | | 1.5 | 0.5 | 0.5 |
| | BDBzTH | | 0 | 1 | 0.5 |
| | Vulcanization accelerating agent | MBT | 0.7 | 0.7 | 0.7 |
| | | TiBtd | 0.8 | 0.7 | 0.8 |
| | | ZnDBC | 0.8 | 0.8 | 0.8 |
| | | DETU | 0.9 | 0.9 | 0.9 |
| | | CLD | 1.0 | 0.6 | 1.0 |
| | Vulcanization accelerating assistant agent | ZnO | 5 | 5 | 5 |
| | | Stearic acid | 2 | 2 | 2 |

TABLE 5-continued

| Classification | | | Comparative Example | Example 13 | Example 14 |
|---|---|---|---|---|---|
| General property | $ML_{1+4}$ (100° C.) | FMB | 50.92 | 56.4 | 54.7 |
| | Rheometer (155° C. × 16 min) | $T_{10}$(min: sec) | 1:32 | 1:29 | 1:28 |
| | | $T_{90}$(min: sec) | 8:15 | 7:48 | 9:34 |
| | | ML(lb-in) | 1.92 | 2.09 | 2.02 |
| | | MH(lb-in) | 18.62 | 21.03 | 19.36 |
| | Specific Gravity | | 1.0938 | 1.0912 | 1.0985 |
| | Hardness (Shore A) | | 66 | 71 | 72 |
| | Tensile Strength (kg/cm$^2$) | | 156 | 147 | 138 |
| | Elongation (%) | | 342 | 254 | 205 |
| Heat aging property | Hardness (Shore A) | | 69 | 75 | 73 |
| | Tensile Strength (kg/cm$^2$) | | 174 | 151 | 162 |
| | Elongation (%) | | 365 | 238 | 207 |
| | Wear amount (mm$^3$) | DIN | 104 | 91 | 99 |
| | Compression set (%) | | 18.78 | 12.1 | 12.9 |

According to Table 5, it can be seen that Examples 13 and 14 do not reach 12% or less as a target value of the compression set. However, as compared with Comparative Example, it can be seen that the properties and the compression set are excellent.

[Evaluation for Application to Weather Strip for Extruding]

The EPDM rubber compositions prepared in Comparative Example, and Examples 9 and 13 was extruded. In addition, experimental results of the compression set and the discoloration for each molding product were listed in the following Table 6.

TABLE 6

| | | Compression set 80° C. × 45 hr (%) | | |
|---|---|---|---|---|
| Classification | Spec | Comparative Example | Sample of Example 13 | Sample of Example 9 |
| Roof | 30% or less | 29.8 | 26.7 | 23.7 |
| Latch | | 28.6 | 25.9 | 23.2 |
| Hinge | | 26.4 | 24.2 | 17.1 |
| Discoloration test result | No discoloration | Clear discoloration | No discoloration | No discoloration |
| Wetting 80° C. × 720 hr × humidity 95% | | | | |
| Total accelerating agent amount/ BDBZTH amount/ free sulfur amount | 4.2/0/1.5 | 3.7/1.0/0.5 | 3.7/1.0/0.5 | |

As confirmed from the result of Table 6, an extrusion-molded article using the rubber composition of Example 9 had excellent performance in the experimental results of the compression set and the discoloration. As the result, heat resistance is improved by adding BDBzTH of Chemical Formula 1 to the EPDM rubber having a pattern viscosity ($ML_{1+8}$ at 125° C.) of 90 or more and an ENB content of 9 wt % or more. Further, a carbamate group of the BDBzTH participates as the accelerating agent and thus it is shown that a small content of accelerating agent is used and whiteness is improved.

According to Table 6, when comparing a surface state of an extrusion article under a wetting condition, it can be seen that the extrusion-molded article using the rubber composition of Example 9 is excellent as compared with the molding article of Comparative Example or Example 13.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An ethylene-propylene-diene monomer (EPDM) rubber composition, comprising:
   100 parts by weight of an EPDM rubber having a Mooney viscosity ($ML_{1+8}$ at 125° C.) value of 90 to 95 and a content of 5-ethylidene-2-norbornene (ENB) of from 9 to 15 wt %, and does not include oil;
   from 0.5 to 1.0 part by weight of free sulfur; and
   from 0.5 to 1.5 parts by weight of 1,6-bis(N,N-dibenzyl-thiocarbamoyldithio)-hexane (BDBzTH).

2. The EPDM rubber composition of claim 1, wherein the EPDM rubber composition has a compression set of less than 12%.

3. The EPDM rubber composition of claim 1, further comprising:
   from 2.5 to 8 parts by weight of a vulcanization accelerating agent of one or more kinds selected from the group consisting of 2-mercaptobenzothiazole (MBT), tetra(iso-butyl)thiuram disulfide (TiBTD), zinc dibutyl dithiocarbamate (ZnDBC), N,N-diethylthiourea (DETU), and caprolactam disulfide (CLD), based on 100 parts by weight of the EPDM rubber.

4. The EPDM rubber composition of claim 1, further comprising:
   from 3.0 to 8.0 parts by weight of a vulcanization accelerating assistant agent of one or more kinds selected from the group consisting of zinc oxide (ZnO) and stearic acid based on 100 parts by weight of the EPDM rubber.

5. The EPDM rubber composition of claim 1, further comprising less than about 10 parts by weight an antioxidant based on 100 parts by weight of the EPDM rubber.

6. The EPDM rubber composition of claim 1, further comprising about 0 to 5 parts by weight of a wax having a specific gravity of about 0.90 or less and a melting temperature of about 160° C. or more based on 100 parts by weight of the EPDM rubber.

7. The EPDM rubber composition of claim 1, further comprising about 20 to 60 parts by weight of an inorganic filler having a particle size of about 10 μm or less and a whiteness of about 90% or more based on 100 parts by weight of the EPDM rubber.

8. The EPDM rubber composition of claim 7, wherein the inorganic filler comprises calcium carbonate.

9. A sponge section of a weather strip of a passenger car comprising the EPDM rubber composition of claim 1.

10. The sponge section of claim 9, wherein the EPDM rubber composition is molded into a sheet shape or a band shape.

* * * * *